United States Patent
Esteve-Subirana et al.

[15] 3,681,503
[45] Aug. 1, 1972

[54] METHOD FOR COMBATING DISTURBANCES OF THE LIPID CONTENT OF THE BLOOD

[72] Inventors: Antonio Esteve-Subirana, Barcelona, Spain; Chislain Coutellier, Bruxelles, Belgium

[73] Assignees: Laboratoires OM, S.A., Geneva, Switzerland; Delalande S.A., Courbevoie, France

[22] Filed: April 17, 1970

[21] Appl. No.: 29,683

[52] U.S. Cl. ................................................424/316
[51] Int. Cl. ............................................A61k 27/00
[58] Field of Search......................................424/316

[56] References Cited

OTHER PUBLICATIONS

Chem. Abst. Vol. 58 (1963) page 3332b.
Merck Index Vol. 8 (1968) page 426.

*Primary Examiner*—Sam Rosen
*Attorney*—Hume, Clement, Hume and Lee

[57] ABSTRACT

The diethylammonium salt of hydroquinone sulfonic acid is used against disturbances of the lipid content of the blood, and against affectations stemming from such disturbancies.

2 Claims, No Drawings

METHOD FOR COMBATING DISTURBANCES OF THE LIPID CONTENT OF THE BLOOD

BACKGROUND OF THE INVENTION

Salts of hydroquinone sulfonic acid are known to be very valuable medicaments against hemorrhagic and blood capillary diseases. It has now been found that the diethylammonium salt of hydroquinone sulfonic acid (having the generic name "etamsylate" according to the WHO list) has also a specific action on the blood lipids.

During the treatment of patients suffering from diabetic retinitis and atheromatosis, effects were observed which could not simply be attributed to the regression of vascular fragility. Seing that atheromatosis and diabetic arteritis, in addition to their connection with vascular fragility, are influenced by other factors, such as modifications of a pathological nature of this same wall, which have been correlated to disturbances of lipid metabolism, one must consider that the two entities, which are related to disturbances of the capillary physiology, could also be advantageously modified by the administration of etamsylate.

OBJECT OF THE INVENTION

Based on the clinical findings, the object of the present invention is a method for combating disturbances of the lipid content of the blood, and diseases stemming from such disturbances, comprising treating humans or animals with an effective amount of the diethylammonium salt of hydroquinone sulfonic acid in a suitable pharmaceutical carrier.

GENERAL DESCRIPTION OF THE INVENTION

The effect was first studied on laboratory animals, by subjecting them to a diet rich in cholesterol. After determining the total cholesterolemia, both free and esterified, the total lipids and the lipidogram, the animals were divided into several groups, one of these groups remaining as a reference group for the observation of the hematic concentrations of this substance. The remaining animals are used for checking the effects from the intramuscular administration of 100 mg/kg of etamsylate, the same biological parameters being measured again after two weeks' treatment and dieting.

Effect of etamsylate on the lipemic picture:

Albino rabbits weighing between 1,400 g and 2,000 g were used. An analysis was made at the beginning of the test, and another after 2 weeks of feeding with food containing 1 percent cholesterol. The initial figures for the reference group are given in the following table:

| Free cholesterol g % | Esterified cholesterol g % | Total cholesterol g % | Total lipids mg % | α Lipoproteins % | β Lipoproteins % | Ratio β/α |
|---|---|---|---|---|---|---|
| 0,20 | 0,40 | 0,60 | 682 | 31 | 69 | 2,23 |
| 0,35 | 0,45 | 0,80 | 765 | 39 | 61 | 1,56 |
| 0,20 | 0,41 | 0,61 | 897 | 40 | 60 | 1,50 |
| 0,30 | 0,24 | 0,54 | 700 | 20 | 80 | 4,00 |
| 0,30 | 0,35 | 0,65 | 500 | 30 | 70 | 2,33 |
| 0,15 | 0,33 | 0,48 | 425 | 39 | 61 | 1,56 |
| 1,50 | 2,18 | 3,68 | 3969 | 199 | 401 | 13,18 |
| average: 0,25 | 0,36 | 0,61 | 661,5 | 33,1 | 66,8 | 2,19 |

The results obtained with the reference group after 2 weeks of feeding with food containing 1 percent of cholesterol are as follows:

| Free cholesterol g % | Esterified cholesterol g % | Total cholesterol g % | Total lipids mg % | α Lipo- α proteins % | β Lipo- β proteins % | β/α ratio |
|---|---|---|---|---|---|---|
| 1,10 | 1,47 | 2,57 | 599 | 15 | 85 | 5,7 |
| 2,00 | 1,03 | 3,03 | 731,8 | 10 | 90 | 9,0 |
| 1,95 | 1,30 | 3,25 | 747 | 13 | 87 | 6,7 |
| 1,65 | 0,63 | 2,28 | 740 | 17 | 83 | 4,9 |
| 1,29 | 1,74 | 3,03 | 750 | 12 | 88 | 7,3 |
| 1,20 | 1,60 | 2,80 | 648,8 | 31 | 79 | 3,8 |
| 9,19 | 7,77 | 16,96 | 4216,6 | 88 | 512 | 37,4 |
| average: 1,53 | 1,30 | 2,83 | 702,8 | 14,7 | 85,3 | 6,2 |

Initial figures for the group treated intramuscularly with 100 mg/kg of etamsylate, 6 days a week:

| Free cholesterol g % | Esterified cholesterol g % | Total -terol g % | mg % | α Lipo- % | β Lipo- % | ratio |
|---|---|---|---|---|---|---|
| 0,30 | 0,32 | 0,62 | 425 | 45 | 55 | 1,2 |
| 0,25 | 0,37 | 0,62 | 480 | 30 | 70 | 2,3 |
| 0,21 | 0,33 | 0,54 | 620 | 35 | 65 | 1,8 |
| 0,27 | 0,25 | 0,52 | 183 | 49 | 51 | 1,0 |
| 0,17 | 0,25 | 0,42 | 367 | 35 | 65 | 1,8 |
| 0,21 | 0,19 | 0,40 | 316 | 40 | 60 | 1,5 |
| 1,41 | 1,71 | 3,12 | 2391 | 234 | 366 | 9,6 |
| average: 0,235 | 0,285 | 0,520 | 398,5 | 39 | 61 | 1,60 |

The results obtained from the group treated intramuscularly with 100 mg/kg of etamsylate, 6 days a week, after 2 weeks of feeding with a food containing 1 percent of cholesterol are as follows:

| Free Total cholesterol g % | Esterified cholesterol g % | Total cholesterol g % | Total lipids mg % | α Lipoproteins % | β Lipoproteins % | β/α |
|---|---|---|---|---|---|---|
| 0,42 | 0,38 | 0,80 | 433 | 22 | 78 | 3,5 |
| 0,99 | 0,79 | 1,78 | 569 | 28 | 72 | 2,5 |
| 0,75 | 1,05 | 1,80 | 455 | 21 | 79 | 3,7 |
| 0,25 | 0,50 | 0,75 | 865 | 28 | 72 | 2,5 |
| 0,72 | 0,96 | 1,68 | 432 | 42 | 58 | 1,3 |
| 3,13 | 3,68 | 6,81 | 2752 | 141 | 359 | 13,5 |
| average: 0,626 | 0.736 | 1,362 | 550,4 | 28,2 | 71,8 | 2,70 |

The previous results can be summarized in the following table:

| | | Free chol. | Est. chol. | total chol. | total lipid | α Lip. | β Lip. | β/α ratio |
|---|---|---|---|---|---|---|---|---|
| Test group | Initial | 0,25 | 0,36 | 0,61 | 661,5 | 33,1 | 66,8 | 2,19 |
| | after 2 w. | 1,53 | 1,30 | 2,83 | 702,8 | 14,7 | 85,3 | 6,2 |
| Treated group | Initial | 0,235 | 0,285 | 0,520 | 398,5 | 39 | 61 | 1,60 |
| | after 2 w. | 0,626 | 0,736 | 1,362 | 550,4 | 28,2 | 71,8 | 2,70 |

SPECIFIC EMBODIMENTS OF THE INVENTION

In view of the favorable results obtained after administration of etamsylate, to achieve a modification of lipemia in rabbits, several human clinical experiments were carried out. For this test tablets of commercial etamsylate were used, each tablet containing 250 mg of the product, at a rate of 3 tablets per day for 30 to 45 days. The detailed results are given in the four following tables:

TABLE 1

Clinical test on 25 atheromatosis patients.

Administration of 750 mg etamsylate (3 tablets of 250 mg per day). Duration of treatment: 30 days

| case no | Before cholesterolemia total | | After cholesterolemia total | | Before lipoproteins | | | After lipoproteins | | |
|---|---|---|---|---|---|---|---|---|---|---|
| | total | es-ter. % | total | es-ter. % | $\alpha$ | $\beta$ | $\beta/\alpha$ | $\alpha$ | $\beta$ | $\beta/\alpha$ |
| 1 | 285 | 115 45 | 240 | 115 48 | 15 | 85 | 5,6 | 19 | 81 | 4,2 |
| 2 | 250 | 130 52 | 230 | 125 56 | 18 | 82 | 4,5 | 20 | 80 | 4 |
| 3 | 280 | 172 61 | 260 | 144 56 | 13 | 87 | 6,6 | 15 | 85 | 5,6 |
| 4 | 240 | 140 60 | 240 | 145 63 | 15 | 85 | 5,6 | 20 | 80 | 4 |
| 5 | 260 | 140 54 | 270 | 160 60 | 15 | 85 | 5,6 | 15 | 85 | 5,6 |
| 6 | 240 | 155 65 | 240 | 120 50 | 24 | 76 | 3,1 | 28 | 72 | 2,5 |
| 7 | 260 | 130 50 | 240 | 135 56 | 19 | 81 | 4,2 | 23 | 77 | 3,3 |
| 8 | 280 | 150 54 | 260 | 140 54 | 11 | 89 | 8,0 | 18 | 82 | 4,5 |
| 9 | 260 | 145 55 | 265 | 140 53 | 20 | 80 | 4 | 24 | 76 | 3,1 |
| 10 | 240 | 165 70 | 240 | 160 67 | 20 | 80 | 4 | 24 | 76 | 3,1 |
| 11 | 280 | 168 60 | 280 | 180 65 | 15 | 85 | 5,6 | 18 | 82 | 4,5 |
| 12 | 270 | 160 60 | 265 | 165 62 | 18 | 82 | 4,5 | 20 | 80 | 4 |
| 13 | 220 | 115 54 | 230 | 135 60 | 20 | 80 | 4 | 20 | 80 | 4 |
| 14 | 260 | 160 62 | 250 | 180 72 | 19 | 81 | 4,2 | 21 | 79 | 3,7 |
| 15 | 220 | 140 65 | 210 | 160 76 | 20 | 80 | 4 | 20 | 80 | 4 |
| 16 | 254 | 145 57 | 260 | 165 66 | 15 | 85 | 5,6 | 20 | 80 | 4 |
| 17 | 280 | 160 58 | 260 | 168 65 | 20 | 80 | 4 | 25 | 75 | 3 |
| 18 | 180 | 110 61 | 220 | 125 58 | 15 | 85 | 5,6 | 20 | 80 | 4 |
| 19 | 240 | 135 57 | 230 | 138 60 | 14 | 86 | 6,1 | 20 | 80 | 4 |
| 20 | 240 | 180 75 | 240 | 180 75 | 21 | 79 | 3,7 | 20 | 80 | 4 |
| 21 | 220 | 135 61 | 210 | 140 66 | 16 | 84 | 5,2 | 19 | 81 | 4,2 |
| 22 | 236 | 150 62 | 230 | 180 77 | 20 | 80 | 4 | 20 | 80 | 4 |
| 23 | 180 | 108 60 | 220 | 145 65 | 15 | 85 | 5,6 | 15 | 85 | 5,6 |
| 24 | 194 | 116 60 | 210 | 130 60 | 15 | 85 | 5,6 | 20 | 80 | 4 |
| 25 | 240 | 120 50 | 230 | 140 62 | 20 | 80 | 4 | 20 | 80 | 4 |
| avg. values | 242 | 142 58,7 | 241 | 148,5 62,1 | 17,4 | 82,6 | 4,74 | 20,2 | 79,8 | 3,95 |

STATISTICAL ANALYSIS OF TABLE 1

| | Average values before | after | $t_{24}$ | remarks |
|---|---|---|---|---|
| Prothrombin time | 91.0 | 91.2 | 0.2 | not significant |
| Fibrinogen level | 300 | 296 | 0.6 | not significant |
| Counting of platelets | 257.6 | 257.2 | 0.1 | not significant |
| Bleeding time | 3.36 | 2.35 | 6.0 | very significant ($p<0.001$) |
| Fragility index | 33.8 | 7.6 | 10.0 | very significant ($p<0.001$) |
| Total esterified blood chloesterol | 58.7 | 62.1 | 2.6 | significant ($p<0.025$) due to the ester increase after treatment |
| Lipoprotein $\beta/\alpha$ ratio | 4.92 | 4.04 | 3.0 | significant ($p<0.01$) mainly due to the $\alpha$ increase after treatment |

TABLE 2

Oral administration of 750 mg of ETAMSYLATE for 25-60 days Patients suffering from dyslipidemia without abnormal capillary fragility

| No | Init | Age | Duration of treatment | Chlorestrol before | after | Esterif. ratio before | after | Lipoprotein ratio before | after |
|---|---|---|---|---|---|---|---|---|---|
| 1 | PG | 50 | 40 days | 345 | 222 | 60 | 70 | 90/10=9 | 80/20=4 |
| 2 | VV | 48 | 45 days | 293 | 250 | 55 | 71 | 85/15=5.6 | 75/25=3 |
| 3 | UE | 72 | 30 days | 320 | 260 | 62 | 73 | 90/10=9 | 78/22=3.54 |
| 4 | SL | 46 | 25 days | 282 | 225 | 70 | 82 | 85/15=5.6 | 72/28=2.5 |
| 5 | BC | 64 | 45 days | 324 | 280 | 60 | 71 | 80/20=4 | 77/23=3.3 |
| 6 | CL | 39 | 60 days | 260 | 225 | 51 | 75 | 82/18=4.5 | 75/25=3 |
| 7 | FG | 41 | 50 days | 282 | 250 | 72 | 80 | 89/11=8/1 | 79/21=3.7 |
| 8 | SM | 38 | 55 days | 258 | 206 | 56 | 83 | 84/16=5.2 | 75/25=3 |

TABLE 3

Arterio-sclerosis or diabetic patients with important alterations of the lipidogram - ETAMSYLATE: 750 mg orally for 1 month

| init | Total lipids mg % before | after | Rapport lipoproteins $\beta/\alpha$ ratio before | after | Total cholesterol before | after | Esterified cholesterol before | after | % of esterification before | after |
|---|---|---|---|---|---|---|---|---|---|---|
| RT | 825 | 1025 | 5.25 | 4.90 | 240 | 218 | 100 | 130 | 41 | 60 |
| DV | | | 3.15 | 2.45 | 167 | 200 | 70 | 81 | 42 | 41 |
| LM | 805 | 735 | 3.40 | 3 | 178 | 180 | 74 | 80 | 41 | 44 |
| PF | 770 | 675 | 4.70 | 4.10 | 256 | 230 | 108 | 104 | 42 | 45 |
| MC | 1040 | 895 | 4.10 | 4 | 308 | 280 | 153 | 139 | 50 | 50 |
| MG | 770 | 595 | 3.85 | 3.90 | 194 | 220 | 90 | 104 | 46 | 47 |
| AE | 1780 | 1260 | 5.35 | 4.80 | 285 | 275 | 132 | 145 | 46 | 53 |

Treatment: 3 tablets per day for one month

TABLE 4

Arterio-sclerosis or diabetic patients with important alterations of the lipidogram - ETAMSYLATE: 750 mg orally for 1 month

| init | Total lipids mg % before | after | Rapport lipoproteins $\beta/\alpha$ ratio before | after | Total cholesterol before | after | Esterified cholesterol before | after | % of esterification before | after |
|---|---|---|---|---|---|---|---|---|---|---|
| RT | 850 | 800 | 4.90 | 4.15 | 257 | 235 | | | | |
| SC | 965 | 740 | 4.00 | 3.55 | 215 | 210 | 105 | 115 | 49 | 55 |
| PM | 820 | 895 | 5.25 | 4.25 | 296 | 258 | 145 | 129 | 49 | 50 |

Treatment: 3 tablets per day for one month

It may easily be deduced from the above results that the influence of etamsylate on lipid metabolism is significant. This effect leads to a definite decrease of the lipoprotein $\beta/\alpha$ ratio, a decrease of the blood cholesterol level, when the latter is very high, and an increase of the esterification percentage of the cholesterol. These important alterations allow one to conclude that this medicament is indicated and valuable for the treatment of dyslipidemia, atheromatosis and diabetic arteritis.

We claim:

1. A method for modifying the lipoprotein $\beta/\alpha$ ratio of the blood the process which comprises, treating humans and animals in need of such modification by the steps of administering thereto the diethylammonium salt of hydroquinone sulfonic acid in a suitable pharmaceutical carrier and in amounts and for a time sufficient to decrease the lipoprotein $\beta/\alpha$ ratio of the blood.

2. A method for reducing the cholesterol content of the blood which comprises, treating humans and animals having abnormally high amounts of blood cholesterol by administering thereto the diethylammonium salt of hydroquinone sulfonic acid in a suitable pharmaceutical carrier in amounts and for a time sufficient to reduce the cholesterol blood level.

* * * * *